US011783119B2

(12) United States Patent
Saimani et al.

(10) Patent No.: US 11,783,119 B2
(45) **Date of Patent: *Oct. 10, 2023**

(54) CUSTOM REPORT BUILDER

(71) Applicant: Intuit Inc., Mountain View, CA (US)

(72) Inventors: Jayanth Saimani, Bangalore (IN); Ashish Kumar Mishra, Bangalore (IN); Manish Ramesh Shah, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,185

(22) Filed: Apr. 25, 2022

(65) Prior Publication Data

US 2022/0335210 A1 Oct. 20, 2022

Related U.S. Application Data

(63) Continuation of application No. 17/366,002, filed on Jul. 1, 2021.

(30) Foreign Application Priority Data

Apr. 20, 2021 (IN) ............................ 202141018217

(51) Int. Cl.

*G06F 40/174* (2020.01)
*G06F 9/451* (2018.01)
*G06F 16/901* (2019.01)
*G06F 40/177* (2020.01)
*G06F 3/0482* (2013.01)

(52) U.S. Cl.

CPC .......... *G06F 40/174* (2020.01); *G06F 3/0482* (2013.01); *G06F 9/451* (2018.02); *G06F 16/9024* (2019.01); *G06F 40/177* (2020.01)

(58) Field of Classification Search

CPC ...... G06F 40/174; G06F 3/0482; G06F 9/451; G06F 16/9024; G06F 40/177; G06F 16/367; G06N 5/022

See application file for complete search history.

(56) References Cited

U.S. PATENT DOCUMENTS 10,565,298 B1 * 2/2020 Bisignani et al. ........................... H04M 3/42144 379/88.18

11,055,478 B1 7/2021 Bisignani

* cited by examiner

*Primary Examiner* — Pei Yong Weng

(74) *Attorney, Agent, or Firm* — Ferguson Braswell Fraser Kubasta PC

(57) ABSTRACT

A method may include obtaining a knowledge graph including entities, and determining, for the knowledge graph, a first state including a first selectable entity subset of the entities that are selectable by a user. The first selectable entity subset may include an entity. The method may further include receiving, from the user and via a graphical user interface (GUI), a selection of the entity from the first selectable entity subset, and responsive to the selection, adding the entity to a report schema. The method further includes restricting, by the GUI, a space of selectable entities addable to the knowledge graph to the first selectable entity subset. The report schema may be used to populate a report. The method may further include, responsive to the selection, transitioning the knowledge graph to a second state including a second selectable entity subset of the entities that are selectable by the user.

20 Claims, 11 Drawing Sheets

Selectability Table A 400

Entities A 404

| **Selectability Condition 402** | ***Invoice*** **is a master entity** | ***class*** **is a master entity** | ***vendor*** **is a master entity** |
|---|---|---|---|
| ***No*** entities selected | | | |

Selectability Table B 410

Entities B 414

| **Selectability Condition 412** | ***invoice details*** **can be selectedas a sub-entity** | ***customer*** **can be selected as a sub-entity** |
|---|---|---|
| ***invoice*** entity selected | TRUE | TRUE |

Selectability Table C 420

Entity C 424

| **Selectability Condition 422** | ***invoice details*** **can be selected as a sub-entity** | ***customer*** **can be selected as a sub-entity** | ***class*** **can be selected as a sub-entity** |
| --- | --- | --- | --- |
| ***invoice*** entity selected | TRUE | TRUE | |
| ***invoice details*** entity selected | | | TRUE |

Selectability Table D 430

Attribute 434

| Selectability Condition 432 | *invoice details* can be selected as a sub-entity | *customer* can be selected as a sub-entity | *tax category code* can be selected as an attribute of invoice details |
|---|---|---|---|
| ***invoice*** entity selected | TRUE | TRUE | |
| ***invoice details*** entity selected | | | TRUE |
| **accountant role** attribute enabled | | | TRUE |

FIG. 4G

CUSTOM REPORT BUILDER

CROSS-REFERENCE TO RELATED APPLICATION

This application is a continuation application of U.S. patent application Ser. No. 17/366,002, filed Jul. 1, 2021, which claims benefit under 35 U.S.C. § 119 to Indian Provisional Patent Application No. 202141018217, filed on Apr. 20, 2021, having the same inventors, and entitled "CUSTOM REPORT BUILDER." Indian Provisional Patent Application No. 202141018217, both of which are incorporated herein by reference in their entireties.

BACKGROUND

Conventional systems that enable a user to define a custom report do not guide user report-defining actions to be consistent with the semantics of a domain (e.g., the domain of accounting). For example, when the custom report violates the rules of accounting, erroneous reports may be generated. Alternatively, various errors may be reported to the user after the custom report is defined, potentially resulting in a frustrating user experience where the user makes a succession of attempts to define a report that does not cause errors. In addition, conventional systems may require the custom report to be based on a predefined template, which restricts the possible customizations effected by the user.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining a knowledge graph including entities, and determining, for the knowledge graph, a first state including a first selectable entity subset of the entities that are selectable by a user. The first selectable entity subset includes an entity. The method further includes receiving, from the user and via a graphical user interface (GUI), a selection of the entity from the first selectable entity subset, and responsive to the selection, adding the entity to a report schema. The method further includes restricting, by the GUI, a space of selectable entities addable to the knowledge graph to the first selectable entity subset. The report schema is used to populate a report. The method further includes, responsive to the selection, transitioning the knowledge graph to a second state including a second selectable entity subset of the entities that are selectable by the user.

In general, in one aspect, one or more embodiments relate to a system including a computer processor, a repository configured to store a knowledge graph including entities, a display device including a graphical user interface (GUI), and a report selectability service executing on the computer processor and configured to: obtain the knowledge graph, determine, for the knowledge graph, a first state including a first selectable entity subset of the entities that are selectable by a user. The first selectable entity subset includes an entity. The report selectability service is further configured to receive, from the user and via the GUI, a selection of the entity from the first selectable entity subset, and responsive to the selection, add the entity to a report schema. The report schema is used to populate a report. The GUI restricts a space of selectable entities addable to the knowledge graph to the first selectable entity subset. The report selectability service is further configured to, responsive to the selection, transition the knowledge graph to a second state including a second selectable entity subset of the entities that are selectable by the user.

In general, in one aspect, one or more embodiments relate to a method including receiving, via a graphical user interface (GUI), a custom report request, transmitting the custom report request to a report selectability service configured to perform: obtaining a knowledge graph including entities, and determining, for the knowledge graph, a first state including a first selectable entity subset of the entities that are selectable by a user. The first selectable entity subset includes an entity. The report selectability service is further configured to perform: transmitting, to the GUI, the first selectable entity subset, receiving, from the GUI, a selection of the entity from the first selectable entity subset, and responsive to the selection, adding the entity to a report schema. The report schema is used to populate a report. The report selectability service is further configured to perform: restricting, by the GUI, a space of selectable entities addable to the knowledge graph to the first selectable entity subset. The report selectability service is further configured to perform, responsive to the selection, transitioning the knowledge graph to a second state including a second selectable entity subset of the entities that are selectable by the user. The method further includes receiving, from the user and via the GUI, the selection of the entity from the first selectable entity subset.

Other aspects of the invention will be apparent from the following description and the appended claims.

BRIEF DESCRIPTION OF DRAWINGS

FIG. 4E, FIG. 4F, FIG. 4G, FIG. 4H, and FIG. 4I show examples in accordance with one or more embodiments of the invention.

DETAILED DESCRIPTION

Figure 1A:
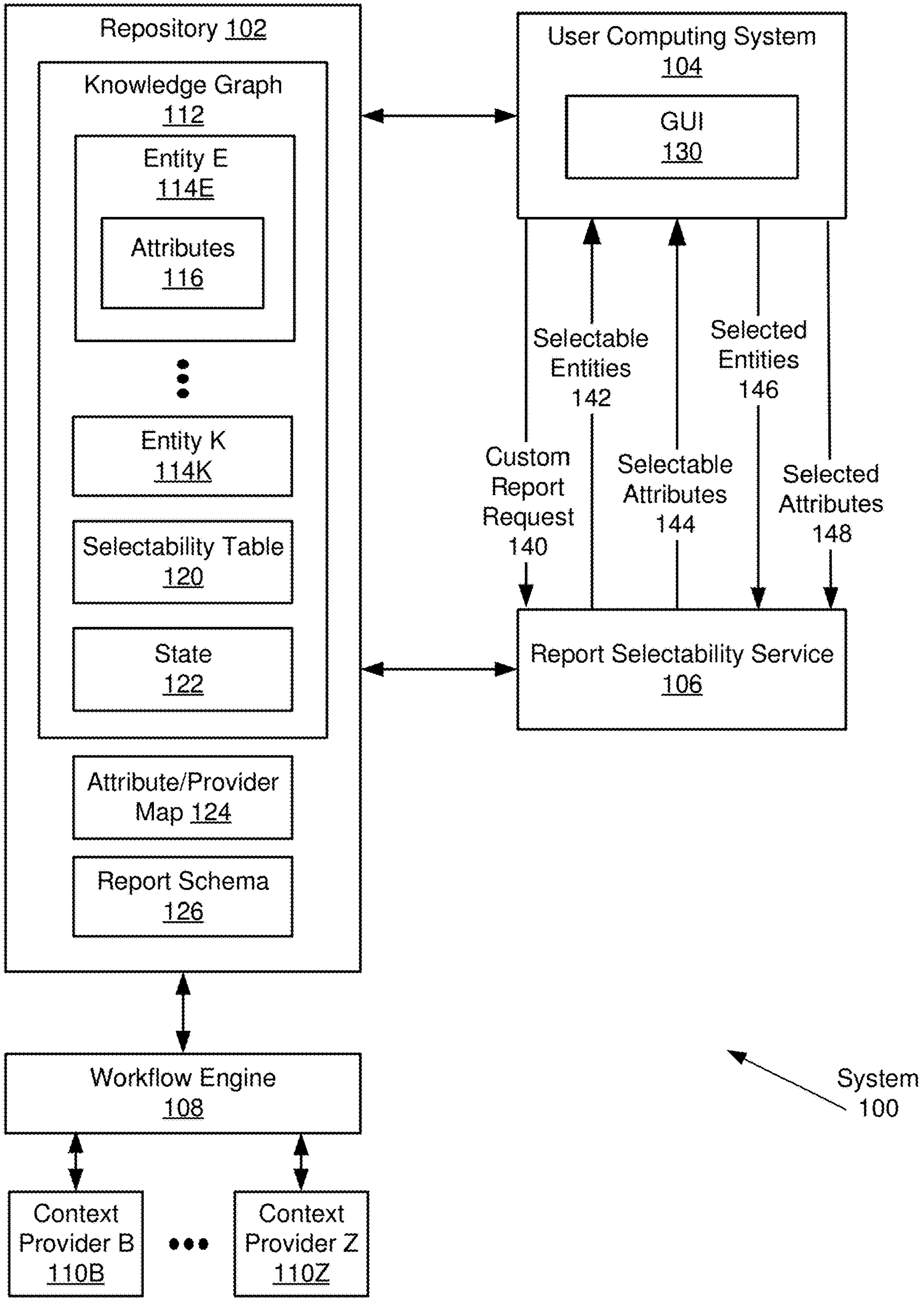
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to building a custom report. A knowledge graph is obtained that encodes the semantics of a domain (e.g., the domain of accounting). The knowledge graph includes entities, selectability conditions, and a state. Examples of entities include: Invoice, Customer, Payment, etc. Each entity may have attributes (e.g., properties or fields). A selectability condition defines an expression, which when satisfied in the state of the knowledge graph, indicates that an entity, or an attribute of an entity, is selectable by a user for addition to a report schema. The state of the knowledge graph includes a subset of the entities that are selectable by a user for inclusion in a report schema. The state of the knowledge graph may further include a subset of the attributes of a selected entity that are selectable by a user for inclusion in a report schema. The user adds entities and/or attributes to the report schema by making selections, via a graphical user interface (GUI), of selectable entities and/or selectable attributes. By restricting the space of selectable entities and/or selectable attributes, the GUI dynamically guides a succession of user actions that refine the report schema to be consistent with the semantics of the domain as represented in the knowledge graph. Successive selections by the user causes the knowledge graph to transition to new states, which in turn causes new subsets of entities and/or attributes to become selectable. Thus, the claimed invention provides the user with a powerful GUI capability, where the user may define a complex report schema without writing any code, via a succession of selections of entities and/or attributes from a knowledge graph. As a result, user satisfaction may be improved, potentially resulting in increased product engagement, positive customer ratings, and an increased sales.

FIG. 1A shows a diagram of a system (100) in accordance with one or more embodiments. As shown in FIG. 1A, the system (100) includes multiple components such as a repository (102), a user computing system (104), a report selectability service (106), a workflow engine (108), and context providers (110B, 110Z). Each of these components is described below.

The repository (102) is any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site. The repository (102) may be accessed online via a cloud service (e.g., Amazon Web Services, Egnyte, Azure, etc.).

The repository (102) includes functionality to store a knowledge graph (112), an attribute/context provider map (124), and a report schema (126). The knowledge graph (112) is a directed acyclic graph that includes entities (114E, 114K). The knowledge graph (112) further includes a selectability table (120) and a state (122). The selectability table (120) and the state (122) of the knowledge graph (112) may be used to guide a succession of user actions that refine the report schema (126) to be consistent with the semantics of a domain as represented in the knowledge graph (112), as described below. In one or more embodiments, an entity (114E) is an element of the knowledge graph (112) for which one or more attributes (116) may be provided. As an example, an entity (e.g., InvoiceDetails) may correspond to a row in a table of a database, and attributes (e.g., CustomerID, VendorID, OrderDate, Amount, etc.) may correspond to columns in the table. Other examples of attributes may include: a permission (e.g., a role-based access control (RBAC) permission), a region (e.g., a region in which a user is located), a role (e.g., a position of a user in an organization), a data set to be fetched, a component of a state or feature of a system, etc.

Figure 1B:
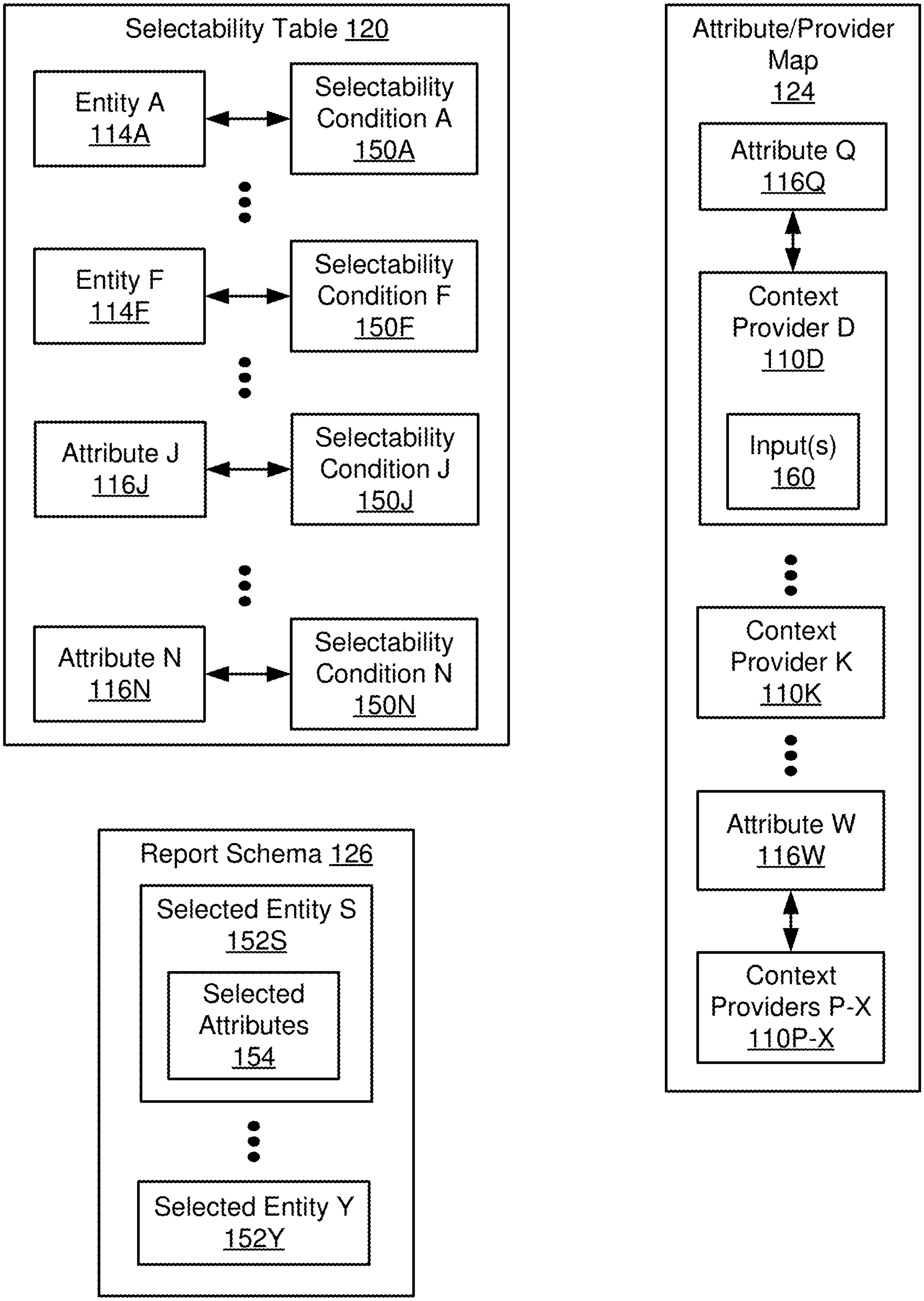

The state (122) of the knowledge graph (112) may include one or more of the following: selections of one or more entities (114E, 114K), selections of one or more attributes (116) of an entity, values of attributes (116), selectable entities, selectable attributes of selected entities, etc. Turning to FIG. 1B, the selectability table (120) includes selectability conditions (150A, 150F) corresponding to entities (114A, 114F). A selectability condition (150A) may define a condition (e.g., an expression), which when satisfied in a state (122) of the knowledge graph (112), indicates that the corresponding entity (114A) is selectable (e.g., by a user) for addition to a report schema (126). For example, a selectability condition corresponding to an entity M may be that the state (122) of the knowledge graph (112) indicates that no entities have been selected for addition to a report schema (126). In other words, the entity M, if selected, becomes the first entity added to the report schema (126). The first entity added to the report schema (126) is referred to as a master entity.

As another example, a selectability condition may define a dependency between entities such that the selectability of a first entity, referred to as a child entity, depends on whether a second entity, referred to as a parent entity, has been added to the report schema (126). Continuing this example, a selectability condition may define a dependency of an InvoiceDetails entity on an Invoice entity such that the selectability of the InvoiceDetails entity depends on whether the Invoice entity has been added to the report schema. In other words, the InvoiceDetails entity may be considered to be a sub-entity of the Invoice entity.

As yet another example, a selectability condition corresponding to an entity may require the existence of a value for an attribute X and/or that the value of an attribute Y satisfies a constraint (e.g., the constraint may be that the value of attribute Y exceeds $500). Alternatively, the selectability condition may require a constant value for an attribute X (e.g., the value "true" or the value "false").

The selectability table (120) may further include selectability conditions (150J, 150N) corresponding to attributes (116J, 116N). A selectability condition (150J) may define a condition, which when satisfied in a state (122) of the knowledge graph (112), indicates that the corresponding attribute (116J) is selectable for addition to a report schema (126). For example, the attribute (116J) may be an attribute of an entity that has been added to the report schema (126).

A selectability condition may be a completion condition, which when satisfied, indicates that the knowledge graph (112) is complete relative to a state (122) of the knowledge graph (112). When a completion condition is satisfied, no further modifications to the state (122) of the knowledge graph (112) are needed. Examples of modifications (e.g., by a user) to the state (122) of the knowledge graph (112) may include: selecting or de-selecting an entity, selecting or de-selecting an attribute of an entity, assigning or modifying a value of an attribute (e.g., by a context provider), etc. The state (122) of the knowledge graph (112) may be modified in response to receiving a selection of an entity and/or a selection of an attribute from a user (e.g., via the graphical user interface (GUI) (130)). The selectability table (120) may include multiple completion conditions for a state (122) of the knowledge graph (112). For example, one completion condition may be satisfied by the existence of a value of "true" for a customer approval attribute, and another completion condition may be satisfied by the existence of a value of "true" for an administrator rejection attribute.

The selectability table (120) may be defined by a domain expert for a domain of application. For example, the domain of application may be accounting, and the selectability table (120) may represent accounting rules that define an accounting workflow using entities such as invoices, customers, etc. Continuing this example, the domain of application may be extended for an additional domain, such as payroll. Further continuing this example, the selectability table (120) may represent payroll rules that define a payroll workflow using entities such as salary payments, employees, etc.

Returning to FIG. 1A, the workflow engine (108) includes functionality to obtain a value for an attribute (116) from a context provider (e.g., context provider (110B)). The workflow engine (108) includes functionality to modify the state (122) of the knowledge graph (112) (e.g., by assigning a value to an attribute). The workflow engine (108) includes functionality to obtain values for attributes that lack a corresponding value in the state (122) of the knowledge graph (112). The workflow engine (108) includes functionality to determine whether a selectability condition applied to the state (122) of the knowledge graph (112) is satisfied. The workflow engine (108) includes functionality to modify the state (122) of the knowledge graph (112) (e.g., by assigning a value to an attribute of an entity in the knowledge graph (112)).

The context providers (110B, 110Z) include functionality to provide values for attributes. A context provider (110B) may be an automated system that communicates via Hypertext Transfer Protocol (HTTP), REpresentational State Transfer (REST), Simple Object Access Protocol (SOAP), a message queue, or any other communication protocol. A context provider (110B) may be invoked according to a schedule. For example, the context provider (110B) may be invoked a predefined number of times for each periodic interval. As another example, the context provider (110B) may be invoked repeatedly according to a calendar schedule. Alternatively, a context provider (110B) may be a user. For example, the user may provide the value of an attribute via email, or by entering the value of the attribute directly into the knowledge graph (e.g., via the GUI (130) of the user computing system (104)). Each context provider (110B, 110Z) may include an extraction method that specifies how to extract the value of an attribute from a response received from the context provider (110B). For example, the extraction method may specify how to extract the value from a response received from an application programming interface (API) of the context provider (110B). Continuing this example, the extraction method may specify a JavaScript Object Notation (JSON) path to be applied to a response represented in the JSON output.

Returning to FIG. 1B, the attribute/provider map (124) includes functionality to map attributes (116Q, 116W) to context providers (110D-K, 110P-X). For example, the attribute/provider map (124) may map attribute Q (116Q) to context providers D-K (110D-K) and may map attribute W (116W) to context providers P-X (110P-X). Continuing this example, a value of attribute Q (116Q) may be provided by any of context providers D-K (110D-K) and a value of attribute W (116W) may be provided by provided by any of context providers P-X (110P-X). A context provider (110D) may include input(s) (160). For example, the input(s) (160) may be parameters of an application programming interface (API) of the context provider (110D). Continuing this example, one or more of the input(s) may be required parameters of the API and one or more of the input(s) may be optional parameters of the API. In one or more embodiments, a context provider is not invoked when one or more of the required parameters is unavailable. For example, one or more of the required parameters may correspond to an attribute (116) that lacks a corresponding value in the state (122) of the knowledge graph (112).

The report schema (126) is a data structure that defines a report. For example, the report schema (126) may be used to populate the rows and columns of the report. The report schema (126) includes selected entities (152S, 152Y). For example, a selected entity (152S) may be an entity selected for inclusion in the report schema (126) by a user via the GUI (130) when a selectability condition indicates that the selected entity (152S) is a selectable entity (142) in a state of the knowledge graph (112). The report schema (126) further includes selected attributes (154) for a selected entity (e.g., selected entity (152S)). For example, a selected attribute (154) may be selected for inclusion in a selected entity in the report schema (126) by a user when a selectability condition indicates that the selected attribute (154) is a selectable attribute (148) for the selected entity in a state of the knowledge graph (112). The selectability table (120) and the state (122) of the knowledge graph (112) may be used to restrict the space of selectable entities and/or selectable attributes that may be added to the report schema (126). Thus the knowledge graph (112) may be used to guide a succession of user actions that refine the report schema (126) to be consistent with the semantics of a domain (e.g., the domain of accounting) as represented in the knowledge graph (112). Each successive user action may include selecting selectable entities and/or selectable attributes, such that the user action transitions the knowledge graph (112) to a new state (e.g., a new state in which different entities and/or attributes are selectable).

Figure 5A:
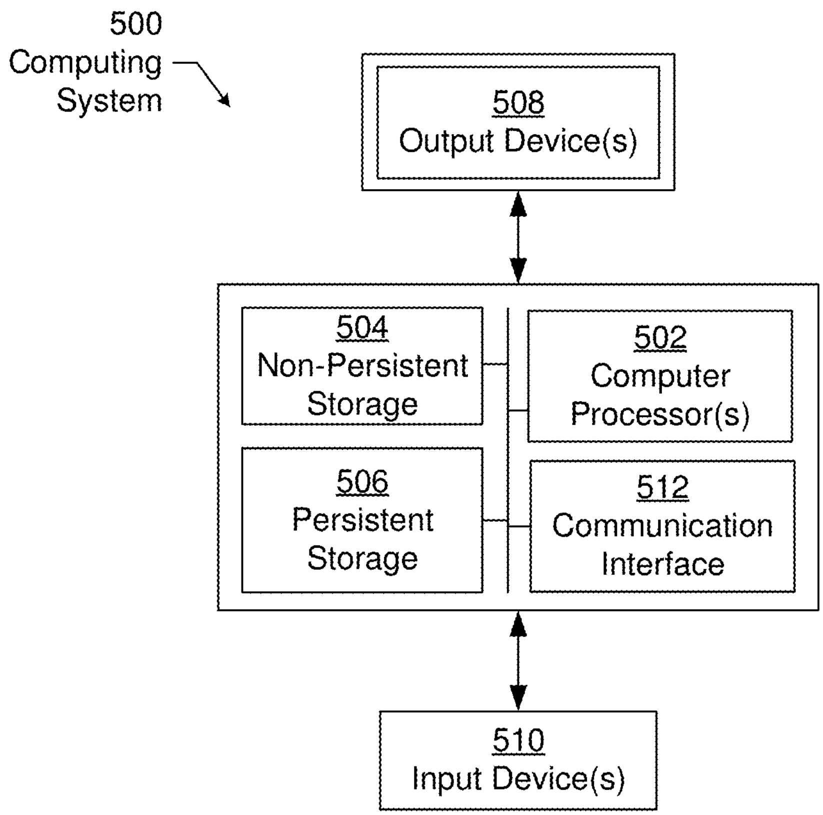
FIG. 5A and FIG. 5B show computing systems in accordance with one or more embodiments of the invention.
Figure 5B:
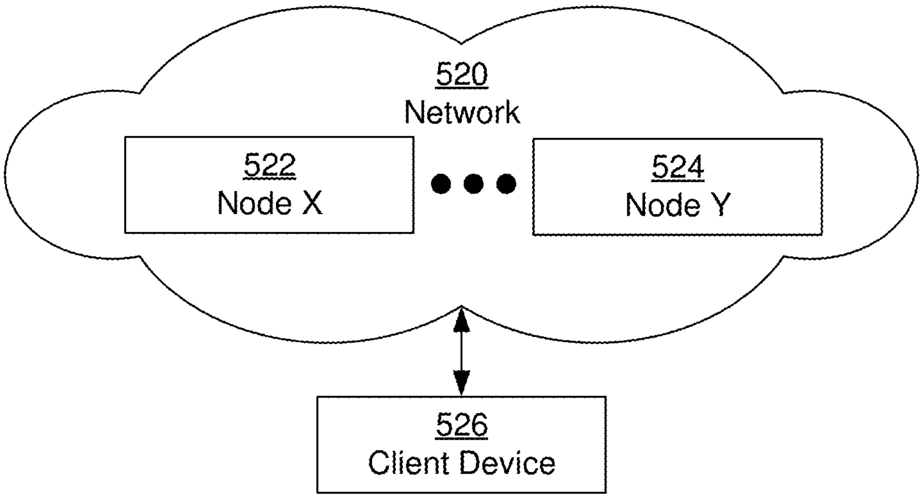

In one or more embodiments, the user computing system (104) provides, to a user, a variety of computing functionality. For example, the computing functionality may include word processing, multimedia processing, financial management, business management, social network connectivity, network management, and/or various other functions that a computing device performs for a user. The user may be a small business owner. Alternatively, the user may be a company employee that acts as a sender, a potential sender, or a requestor of services performed by a company (e.g., a client, a customer, etc.) of the user computing system. The user computing system (104) may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computer system (104) may take the form of the computing system (500) shown in FIG. 5A connected to a network (520) as shown in FIG. 5B.

The user computing system (104) includes a graphical user interface (GUI) (130). The GUI (130) may be a browser user interface. The user computing system (104) may include one or more operating systems (e.g., iOS, Android, etc.). The GUI (130) may be rendered and displayed within a local desktop software application or the UI may be generated by a remote web server and transmitted to a user's web browser executing locally on a desktop or mobile device. The GUI (130) includes functionality for receiving input from a user and transmitting output to the user.

In one or more embodiments, the GUI (130) includes functionality to send (e.g., on behalf of a user) a custom report request (140) to the report selectability service (106). The custom report request (140) indicates that the user wishes to define a report schema (126). The report selectability service (106) includes functionality to determine which entities and/or attributes are selectable in a state (122) of the knowledge graph (112). The report selectability service (106) includes functionality to send selectable entities (142) and/or selectable attributes (144) to the GUI (130). The GUI (130) includes functionality to send selected entities (146) and/or selected attributes (148) to be included in the report schema (126) to the report selectability service (106).

While FIG. 1A shows a configuration of components, other configurations may be used without departing from the scope of the invention. For example, various components may be combined to create a single component. As another example, the functionality performed by a single component may be performed by two or more components.

Figure 2:
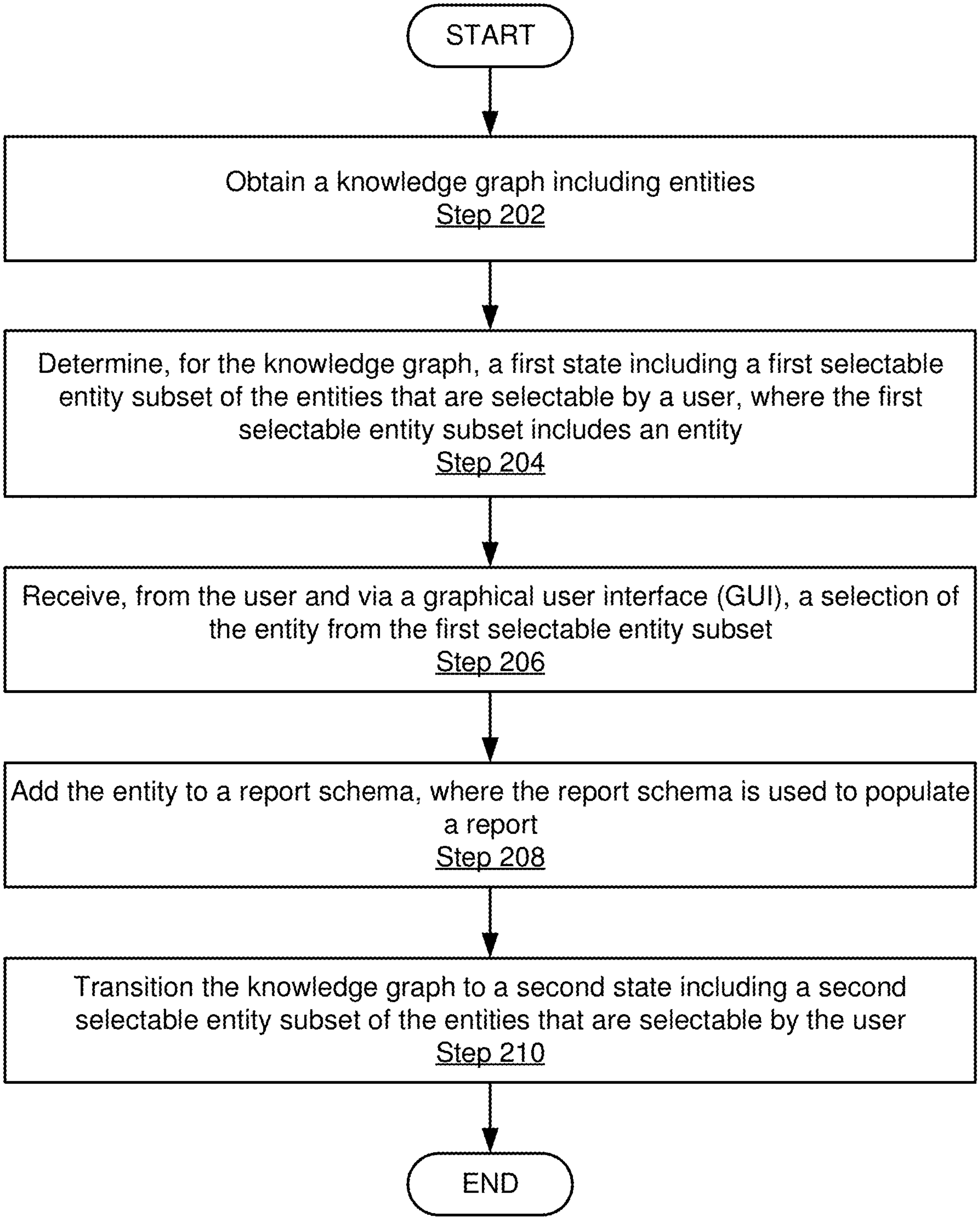
FIG. 2 and FIG. 3 show flowcharts in accordance with one or more embodiments of the invention.

FIG. 2 shows a flowchart in accordance with one or more embodiments of the invention. The flowchart depicts a process for building a report schema. One or more of the steps in FIG. 2 may be performed by the components (e.g., the workflow engine (108), context providers (110B, 110Z), report selectability service (106), and user computing system (104) of the system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a knowledge graph is obtained. The report selectability service may obtain the knowledge graph from a repository.

In Step 204, a first state is determined for the knowledge graph. The first state of the knowledge graph includes a first selectable entity subset of the entities that are selectable by a user. The report selectability service may determine the first selectable entity subset by applying selectability conditions corresponding to entities in the knowledge graph. For example, the report selectability service may determine that the first selectable entity subset includes an entity (e.g., an Invoice entity) by applying each selectability condition corresponding to the entity until one of the selectability conditions corresponding to the entity indicates that the entity is selectable.

If the selectability condition requires a requires a specific value for an attribute, then the report selectability service determines whether the knowledge graph includes the specific value for the attribute. If the knowledge graph lacks a value for the attribute, then the report selectability service may obtain a value for the attribute from a context provider. For example, the attribute may be a role-based access control (RBAC) value for the user (e.g., the value of an RBAC attribute of the user entity corresponding to a user identifier of the user) obtained from a context provider that manages access control settings for an organization that includes the user. The report selectability service may identify the context provider using an attribute/provider map. For example, the report selectability service may query the attribute/provider map with an identifier of the attribute to obtain identifiers of one or more context providers for the attribute. When there are multiple context providers for the attribute, the report selectability service may select a context provider whose inputs correspond to attributes for which the knowledge graph includes values. In other words, the report selectability service may select a context provider whose inputs, if any, correspond to attributes that have been assigned a value in the knowledge graph.

In Step 206, a selection of an entity from the first selectable entity subset is received, via a graphical user interface (GUI), from the user. The GUI may receive the selection of the entity in response to presenting (e.g., displaying) the first selectable entity subset to the user. For example, the entities in the selectable entity subset may be highlighted in the GUI. The user may select multiple entities from the first selectable entity subset via the GUI.

In Step 208, the entity is added to a report schema. The entity may be added to the report schema by the report selectability service. If the entity added to the report schema is the first entity added to the report schema, then the entity is a master entity. Entities subsequently added to the report schema may be sub-entities (e.g., child entities) of entities (e.g., parent entities) that have been previously added to the report schema. That is, a non-master entity added to the report schema may be a child entity of a parent entity as defined in a selectability condition of the knowledge graph, where the parent entity is already included in the report schema.

The report selectability service may remove an entity E from the report schema in response to receiving, via the GUI, a de-selection of entity E by the user. The report selectability service may identify, using selectability conditions, a dependency of an entity E' in the report schema on the removed entity E, such that entity E' no longer depends, based on applying the selectability conditions of the knowledge graph, on any entity included in the report schema. The report selectability service may then transmit an alert to the user indicating that the entity E' is an orphan entity that lacks a parent entity in the report schema. The user may decide to retract the de-selection of the entity E in response to the notification. Alternatively, the user may contact a domain expert to request a modification to the knowledge graph to prevent the entity E from becoming an orphan entity. For example, the domain expert may add a selectability condition indicating that the entity E' is a sub-entity of another entity F already included in the report schema.

In Step 210, the knowledge graph transitions to a second state including a second selectable entity subset of the entities that are selectable by the user (see description of Step 204 above). One or more entities that were not included in the first selectable entity subset may now be selectable by the user in the second selectable entity subset. Conversely, one or more entities that were selectable by the user in the first selectable entity subset may now excluded from the second selectable entity subset.

The second state of the knowledge graph may further include a selectable attribute subset of attributes of the entity selected in Step 206 above. The GUI may then receive a selection of an attribute from the selectable attribute subset in response to presenting the selectable attribute subset to the user. The user may select multiple attributes from the selectable attribute subset via the GUI.

The report selectability service may add, in the report schema, the selected attribute(s) to the entity selected in Step 206 above. In response to the selection of the attribute(s), the report selectability service may transition the knowledge graph to a third state including a new selectable entity subset of attributes of the entity selected in Step 206 above that are selectable by the user. In other words, the selection of the attribute(s) may result in one or more other attributes of the entity selected in Step 206 becoming selectable in the new state of the knowledge graph.

The report selectability service may determine the selectable attribute subset by applying selectability conditions corresponding to attribute of the entity selected in Step 206 above. For example, the report selectability service may determine that the selectable attribute subset includes an attribute (e.g., an Invoice Number attribute) by applying each selectability condition corresponding to the attribute until one of the selectability conditions corresponding to the attribute indicates that the attribute is selectable.

Step 204, Step 206, Step 208, and Step 210 may be repeatedly executed, as the user refines the report schema by selecting entities and/or attributes for addition to the report schema. Once the state of the knowledge graph satisfies a completion condition, then the report selectability service may disallow further selections of entities or attributes by the user. For example, the completion condition may be satisfied when there are no selectable entities or attributes in the state of the knowledge graph. Continuing this example, the user may then request that a domain expert modify the knowledge graph by adding additional selectability conditions to enable additional entities and/or attributes to be selectable in the current state of the knowledge graph.

Figure 3:
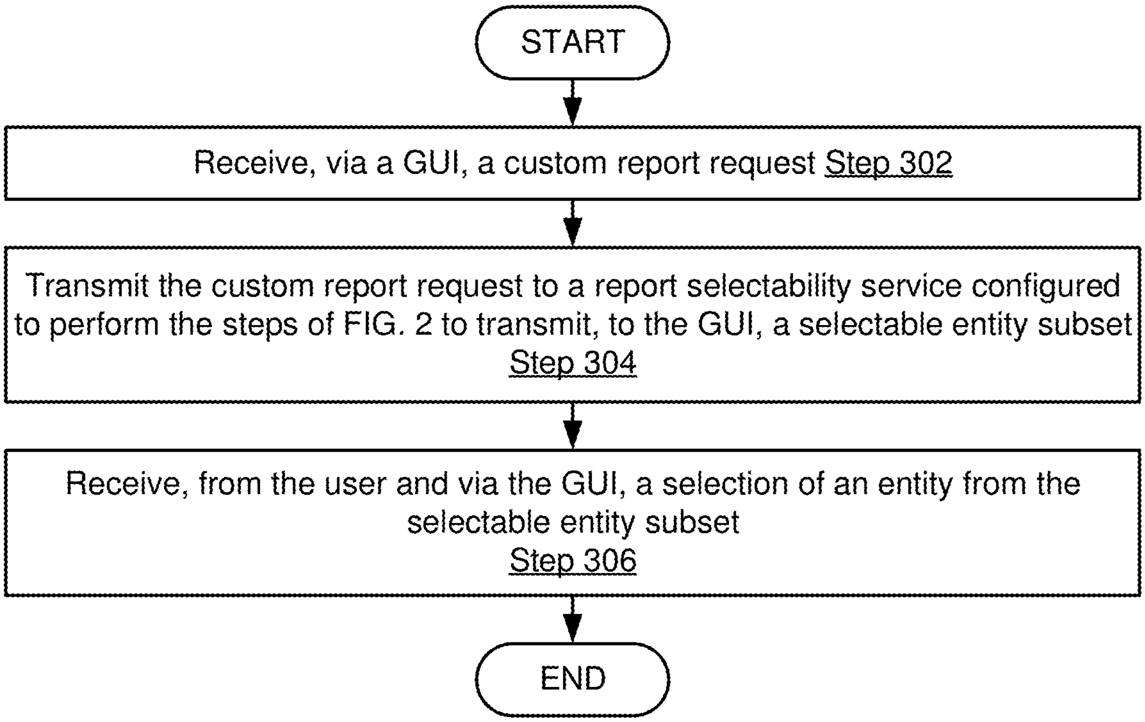

FIG. 3 shows a flowchart in accordance with one or more embodiments of the invention. The flowchart depicts a process for building a report schema. One or more of the steps in FIG. 3 may be performed by the components (e.g., the workflow engine (108), context providers (110B, 110Z), report selectability service (106), and user computing system (104) of the system (100)), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 302, a custom report request is received, via a graphical user interface (GUI). The custom report request indicates that a user wishes to define a report schema.

In Step 304, the custom report request is transmitted to a report selectability service configured to transmit, to the GUI, a selectable entity subset by performing the steps of FIG. 2.

In Step 306, a selection of an entity from the selectable entity subset is received, via the GUI, from the user (see description of Step 206 above).

Figures 4A, 4B:
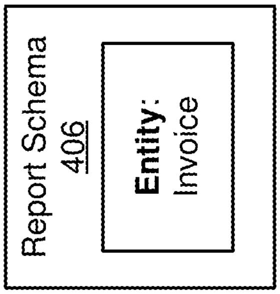
FIG. 4A, FIG. 4B, FIG. 4C, and FIG. 4D show examples in accordance with one or more embodiments of the invention.

The following example is for explanatory purposes only and not intended to limit the scope of the invention. FIG. 4A, FIG. 4B, FIG. 4C, FIG. 4D, FIG. 4E, FIG. 4F, FIG. 4G, FIG. 4H, and FIG. 4I show implementation examples in accordance with one or more embodiments of the invention. FIG. 4A shows a selectability table (400) ((120) in FIG. 1A and FIG. 1B) that includes a selectability condition (402) ((150A, 150F, 150J, 150N) in FIG. 1B) applied to entities (404) ((114E, 114K) in FIG. 1A and (114A, 114F) in FIG. 1B). The selectability condition (402) requires that no entities are selected in a current state $S_0$ of a knowledge graph. In other words, the entities (404) are selectable entities that are potential master entities to be added to a report schema. The report selectability service receives, from a user, a selection of one of the selectable entities (404), in this case the Invoice entity, which is added to the report schema (406) ((126) in FIG. 1A and FIG. 1B) as a master entity, as shown in FIG. 4B. As a result of the user selecting the Invoice entity, the knowledge graph transitions to a next state $S_1$.

Figures 4C, 4D:
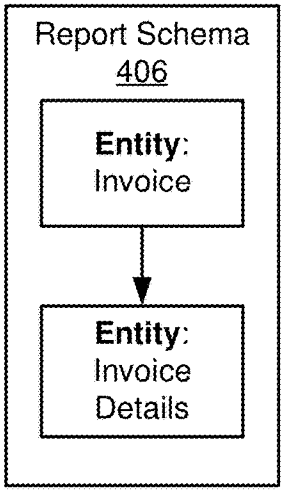

FIG. 4C shows a selectability table (410) that includes a selectability condition (412) applied to entities (414). The selectability condition (412) requires that the Invoice entity has been selected for addition to the report schema (406). In other words, the entities (414) are sub-entities of the Invoice entity. The report selectability service receives, from the user, a selection of one of the selectable entities (414), in this case the Invoice Details entity, which becomes a sub-entity (e.g., a child entity) of the Invoice entity in the report schema (406), as shown in FIG. 4D. As a result of the user selecting the Invoice Details entity, the knowledge graph transitions to a next state $S_2$.

Figures 4E, 4F:
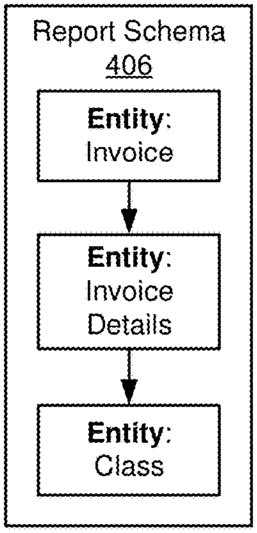

FIG. 4E shows a selectability table (420) that includes a selectability condition (422) applied to entity C Class (424). The selectability condition (422) requires that the Invoice Details entity has been selected for addition to the report schema (406). In other words, entity C Class (424) is a sub-entity of the Invoice Details entity. The report selectability service receives, from the user, a selection of entity C Class (424), which becomes a sub-entity of the Invoice Details entity in the report schema (406), as shown in FIG. 4F. As a result of the user selecting the Class entity, the knowledge graph transitions to a next state $S_3$.

Figure 4H:
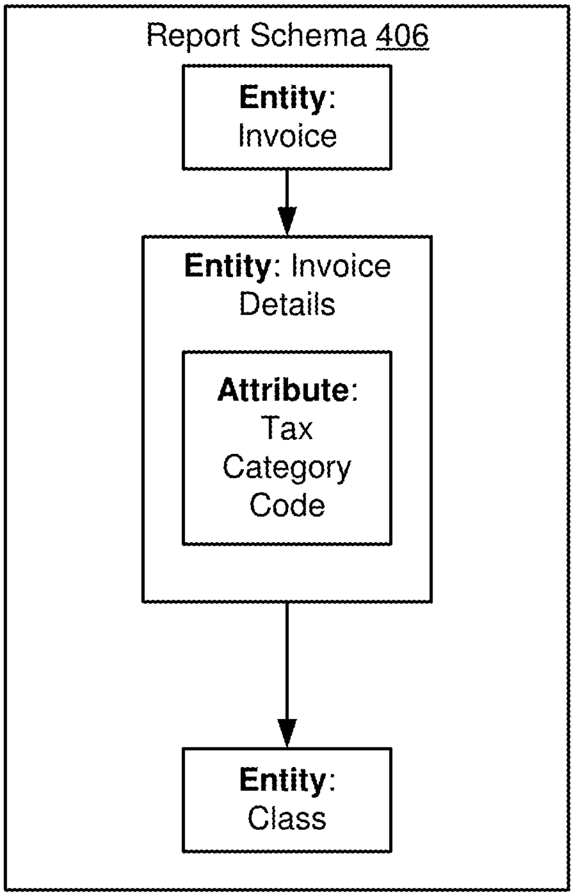

FIG. 4G shows a selectability table (430) that includes a selectability condition (432) applied to a Tax Category Code attribute (434) ((116) in FIG. 1A and (116J, 116N, 116Q, 116W) in FIG. 1B) of the Invoice Details entity. The selectability condition (432) requires that the Invoice Details entity has been selected for addition to the report schema (406) and that the accountant role attribute has the value "true." In other words, the Tax Category Code attribute (434) is a selectable attribute of the Invoice Details entity when the accountant role attribute of the user is set to "true." The report selectability service receives, from the user, a selection of the Tax Category Code attribute (434), which becomes an attribute of the Invoice Details entity in the report schema (406), as shown in FIG. 4H. As a result of the user selecting the Tax Category Code attribute (434), the knowledge graph transitions to a next state $S_4$.

Figure 4I:
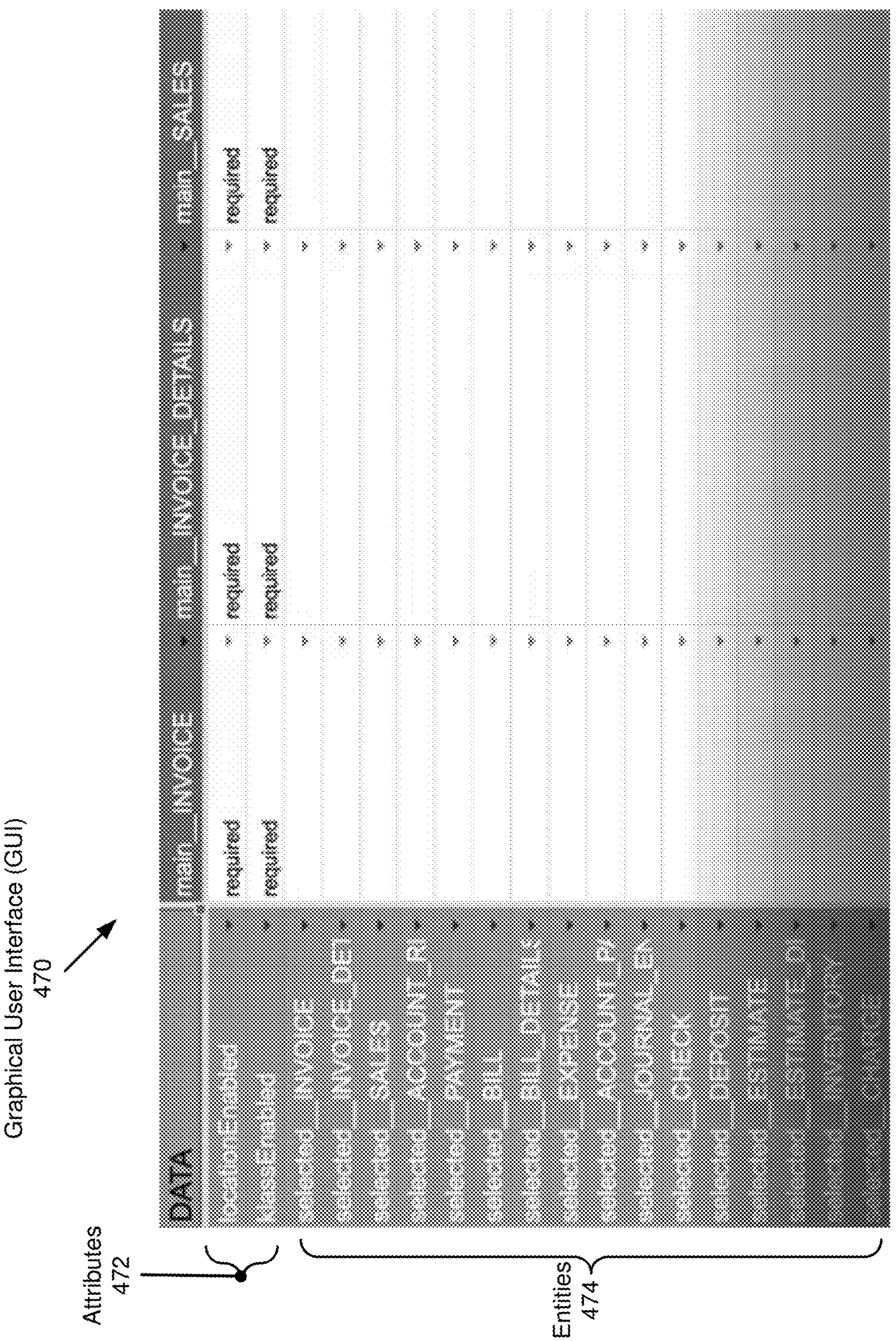

FIG. 4I shows a snapshot of a GUI (470) ((130) in FIG. 1A) that indicates which entities (474) have been selected for addition to a report schema. The GUI (470) allows the user to de-select any of the selected entities (474) via a drop-down menu displayed next to the entity. The GUI (470) also shows attributes (472) that have been enabled (e.g., set to "true") for the user.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel end-points enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:

obtaining a knowledge graph comprising:

a directed acyclic graph that includes, as nodes, the plurality of entities, and a selectability table including a plurality of selectability conditions that define conditions which, when satisfied in a state of the knowledge graph, indicates that a corresponding entity in the plurality of entities is selectable for addition to a report schema;

determining, for the knowledge graph, a first state comprising a first selectable entity subset of the plurality of entities that are selectable by a user, wherein the first selectable entity subset comprises a first entity;

receiving, from the user and via a graphical user interface (GUI), a first selection of the first entity from the first selectable entity subset;

restricting, by the GUI, a space of selectable entities addable to the knowledge graph to the first selectable entity subset; and responsive to the first selection:

adding the first entity to the report schema, wherein the report schema is used to populate a report, and transitioning the knowledge graph to a second state comprising a second selectable entity subset of the plurality of entities that are selectable by the user.

2. The method of claim 1, further comprising:

restricting the report schema refines the report schema to be consistent with semantics of a domain represented in the knowledge graph.

3. The method of claim 2, wherein the knowledge graph further comprises a plurality of attributes comprising a first attribute, and wherein a first selectability condition of the plurality of selectability conditions requires a value for the first attribute, the method further comprising:

determining that the knowledge graph lacks a value for the first attribute; and responsive to determining that the knowledge graph lacks a value for the first attribute, obtaining a value for the first attribute from a context provider.

4. The method of claim 3, further comprising:

determining that the context provider requires an input;

determining that the input corresponds to a second attribute in the plurality of attributes; and determining that the knowledge graph assigns a value to the second attribute, wherein the value for the first attribute is obtained from the context provider in response to determining that the knowledge graph assigns the value to the second attribute.

5. The method of claim 1, wherein the knowledge graph further comprises a plurality of attributes of the first entity, wherein the second state further comprises a first selectable attribute subset of the plurality of attributes of the first entity that are selectable by the user, and wherein the first selectable attribute subset comprises an attribute, the method further comprising:

presenting, via the GUI, the first selectable entity subset;

responsive to the first selection, presenting, via the GUI, the first selectable attribute subset;

receiving, from the user and via the GUI, a second selection of the attribute from the first selectable attribute subset; and responsive to the second selection:

adding, to the first entity and in the report schema, the attribute, and transitioning the knowledge graph to a third state comprising a second selectable attribute subset of the plurality of attributes of the first entity that are selectable by the user.

6. The method of claim 5, wherein the knowledge graph further comprises a second selectability condition in the plurality of selectability conditions, and wherein the first selectable attribute subset is determined to comprise an attribute by applying the second selectability condition to the attribute in the second state of the knowledge graph.

7. The method of claim 1, further comprising:

receiving domain expert modifications to the knowledge graph to add additional selectability conditions to the plurality of selectability conditions; and enabling, using the domain expert modifications, additional entities or attributes to be selectable in the second state of the knowledge graph.

8. A system comprising:

a computer processor;

a repository configured to store a knowledge graph comprising a plurality of entities, wherein the knowledge graph further comprises:

a directed acyclic graph that includes, as nodes, the plurality of entities, and a selectability table including plurality of selectability conditions that define conditions which, when satisfied in a state of the knowledge graph, indicates that a corresponding entity in the plurality of entities is selectable for addition to a report schema;

a display device comprising a graphical user interface (GUI); and a report selectability service executing on the computer processor and configured to:

obtain the knowledge graph;

determine, for the knowledge graph, a first state comprising a first selectable entity subset of the plurality of entities that are selectable by a user, wherein the first selectable entity subset comprises a first entity, receive, from the user and via the GUI, a first selection of the first entity from the first selectable entity subset, restrict, by the GUI, a space of selectable entities addable to the knowledge graph to the first selectable entity subset; and responsive to the first selection:

add the first entity to the report schema, wherein the report schema is used to populate a report, and transition the knowledge graph to a second state comprising a second selectable entity subset of the plurality of entities that are selectable by the user.

9. The system of claim 8, wherein the report selectability service is further configured to:

restrict the report schema refines the report schema to be consistent with semantics of a domain represented in the knowledge graph.

10. The system of claim 9, wherein the knowledge graph further comprises a plurality of attributes comprising a first attribute, wherein a first selectability condition in the plurality of selectability conditions requires a value for the first attribute, and wherein the report selectability service is further configured to:

determine that the knowledge graph lacks a value for the first attribute, and responsive to determining that the knowledge graph lacks a value for the first attribute, obtain a value for the first attribute from a context provider.

11. The system of claim 10, wherein the report selectability service is further configured to:

determine that the context provider requires an input;

determine that the input corresponds to a second attribute in the plurality of attributes; and determine that the knowledge graph assigns a value to the second attribute, wherein the value for the first attribute is obtained from the context provider in response to determining that the knowledge graph assigns the value to the second attribute.

12. The system of claim 8, wherein the knowledge graph further comprises a plurality of attributes of the first entity, wherein the second state further comprises a first selectable attribute subset of the plurality of attributes of the first entity that are selectable by the user, wherein the first selectable attribute subset comprises an attribute, and wherein the report selectability service is further configured to:

present, via the GUI, the first selectable entity subset;

responsive to the first selection, present, via the GUI, the first selectable attribute subset;

receive, from the user and via the GUI, a second selection of the attribute from the first selectable attribute subset; and responsive to the second selection:

add, to the first entity and in the report schema, the attribute, and transition the knowledge graph to a third state comprising a second selectable attribute subset of the plurality of attributes of the first entity that are selectable by the user.

13. The system of claim 12, wherein the knowledge graph further comprises a second selectability condition in the plurality of selectability conditions, and wherein the report selectability service determines that the first selectable attribute subset comprises an attribute by applying the second selectability condition to the attribute in the second state of the knowledge graph.

14. The system of claim 8, wherein the report selectability service is further configured to:

receive, from the user and via the GUI, a de-selection of a second entity in the report schema; and responsive to the de-selection:

determine, using the plurality of selectability conditions, that a third entity in the report schema depends on the second entity, remove the second entity from the report schema to obtain a modified report schema, determine, using the plurality of selectability conditions, that the third entity fails to depend on any entity in the modified report schema, and responsive to determining that the third entity fails to depend on any entity in the modified report schema, transmit an alert to the user indicating that the third entity is an orphan entity.

15. A method comprising:

receiving, via a graphical user interface (GUI), a custom report request;

transmitting the custom report request to a report selectability service configured to perform:

obtaining a knowledge graph comprising a plurality of entities, wherein the knowledge graph further comprises:

a directed acyclic graph that includes, as nodes, the plurality of entities, and a selectability table including a plurality of selectability conditions that define conditions which, when satisfied in a state of the knowledge graph, indicates that a corresponding entity in the plurality of entities is selectable for addition to a report schema, determining, for the knowledge graph, a first state comprising a first selectable entity subset of the plurality of entities that are selectable by a user, wherein the first selectable entity subset comprises a first entity, transmitting, to the GUI, the first selectable entity subset, receiving, from the GUI, a first selection of the first entity from the first selectable entity subset, restricting, by the GUI, a space of selectable entities addable to the knowledge graph to the first selectable entity subset, and;

responsive to the first selection:

adding the first entity to the report schema, wherein the report schema is used to populate a report, transitioning the knowledge graph to a second state comprising a second selectable entity subset of the plurality of entities that are selectable by the user, and receiving, from the user and via the GUI, the first selection of the first entity from the first selectable entity subset.

16. The method of claim 15, further comprising:

restricting the report schema refines the report schema to be consistent with semantics of a domain represented in the knowledge graph.

17. The method of claim 16, wherein the knowledge graph further comprises a plurality of attributes comprising a first attribute, wherein a first selectability condition in the plurality of selectability conditions requires a value for the first attribute, and wherein the report selectability service is further configured to perform:

determining that the knowledge graph lacks a value for the first attribute; and responsive to determining that the knowledge graph lacks a value for the first attribute, obtaining a value for the first attribute from a context provider.

18. The method of claim 17, wherein the report selectability service is further configured to perform:

determining that the context provider requires an input;

determining that the input corresponds to a second attribute in the plurality of attributes; and determining that the knowledge graph assigns a value to the second attribute, wherein the value for the first attribute is obtained from the context provider in response to determining that the knowledge graph assigns the value to the second attribute.

19. The method of claim 15, wherein the knowledge graph further comprises a plurality of attributes of the first entity, wherein the second state further comprises a first selectable attribute subset of the plurality of attributes of the first entity that are selectable by the user, and wherein the first selectable attribute subset comprises an attribute, and wherein the report selectability service is further configured to perform:

presenting, via the GUI, the first selectable entity subset;

responsive to the first selection, presenting, via the GUI, the first selectable attribute subset;

receiving, from the user and via the GUI, a second selection of the attribute from the first selectable attribute subset; and responsive to the second selection:

adding, to the first entity and in the report schema, the attribute, and transitioning the knowledge graph to a third state comprising a second selectable attribute subset of the plurality of attributes of the first entity that are selectable by the user.

20. The method of claim 19, wherein the knowledge graph further comprises a second selectability condition in the plurality of selectability conditions, and wherein the first selectable attribute subset is determined to comprise an attribute by applying the second selectability condition to the attribute in the second state of the knowledge graph.

* * * * *